United States Patent [19]

Woods

[11] Patent Number: 4,828,159

[45] Date of Patent: May 9, 1989

[54] AUTOMATIC FLUSH HEAD FASTENER INSPECTION DEVICE

[75] Inventor: Mark A. Woods, Bellevue, Wash.

[73] Assignee: The Boeing Company, Seattle, Wash.

[21] Appl. No.: 159,194

[22] Filed: Feb. 22, 1988

[51] Int. Cl.$^4$ .............................................. B21J 15/28
[52] U.S. Cl. ................................ 227/156; 227/112; 227/5
[58] Field of Search ............... 227/120, 156, 112, 121, 227/126, 5

[56] References Cited

U.S. PATENT DOCUMENTS

| | | |
|---|---|---|
| 1,230,563 | 6/1917 | Claiborne . |
| 2,643,132 | 6/1953 | Hunziker et al. .................. 279/5 |
| 2,798,605 | 7/1957 | Richards .......................... 209/111 |
| 2,855,600 | 10/1958 | Campbell, Jr. et al. ............ 1/1 |
| 3,173,015 | 3/1965 | Moneypenny et al. ............. 250/217 |
| 3,747,828 | 7/1973 | Dupee et al. ..................... 227/112 |
| 4,220,275 | 9/1980 | Hametner et al. ................. 227/5 |
| 4,396,945 | 8/1983 | DiMatteo et al. ................. 358/107 |
| 4,412,121 | 10/1983 | Kremers et al. .................. 219/124.34 |
| 4,414,566 | 11/1983 | Peyton et al. .................... 358/101 |
| 4,415,926 | 11/1983 | Henry .............................. 358/107 |
| 4,486,775 | 12/1984 | Catlow ............................. 358/106 |
| 4,488,173 | 12/1984 | Di Matteo et al. ................ 358/107 |
| 4,515,507 | 5/1985 | Asai et al. ........................ 414/226 |
| 4,517,593 | 5/1985 | Keller et al. ...................... 358/107 |
| 4,620,656 | 11/1956 | McClay et al. .................... 227/5 |
| 4,628,353 | 12/1986 | Davis, Jr. et al. ................. 358/107 |
| 4,694,984 | 9/1987 | Altwicker ......................... 227/156 |

Primary Examiner—Paul A. Bell
Attorney, Agent, or Firm—Bruce A. Kaser

[57] ABSTRACT

A vacuum chuck (36) moves back and forth from a feed gate (16) to a video imaging position. The chuck (36) has a vacuum line which attaches a fastener (15) to the chuck's forward end surface where it is held as the chuck moves. The feed gate (16) selectively permits or blocks fastener exiting movement from a track (12) and centers the fastener (15) relative to the chuck (36) before it is attached.

5 Claims, 3 Drawing Sheets

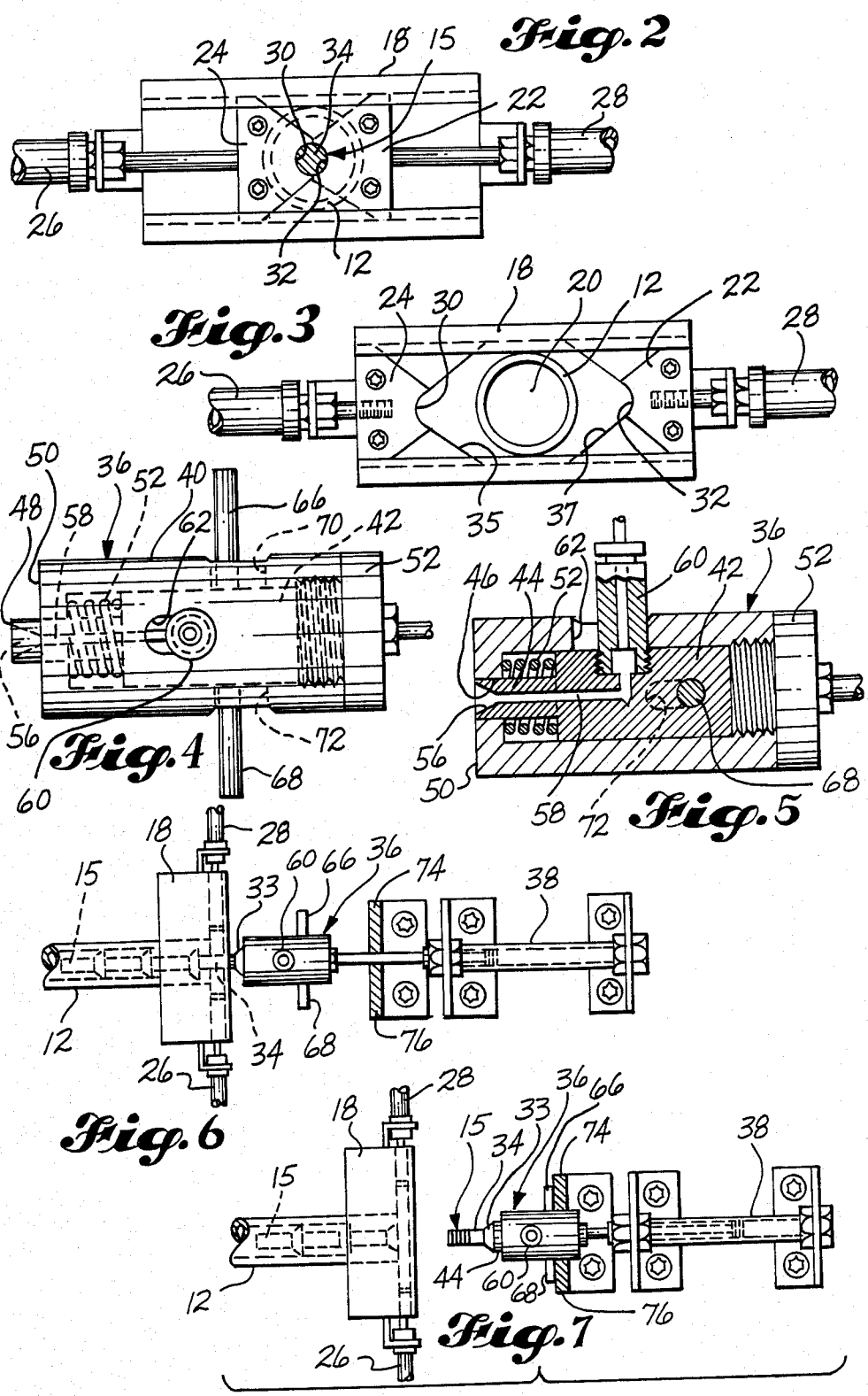

AUTOMATIC FLUSH HEAD FASTENER INSPECTION DEVICE

TECHNICAL FIELD

This invention relates to automatic inspection systems, and particularly, to such systems which are adapted to inspect rivet-like fasteners and the like.

BACKGROUND ART

Huge numbers of fasteners are used in aircraft manufacturing operations. Most or all of these are rivet-like in shape and have a circular head and a cylindrical body. Usually the body has either a threaded or ribbed portion.

It is important to inspect aircraft fasteners prior to use because they may be misshaped or have other flaws. Currently, one method of inspection is to use an optical comparator that is fitted with transparent overlays. This device produces an image of a fastener subject to inspection which shows its actual dimensions, and these dimensions are compared with an overlay showing the fastener's desired dimensions. Typically, each type and size of fastener has a unique set of overlays for gauging fillet radius, head protrusion and head angle. Certain measurements, such as shank and head diameter, are taken with micrometers.

Past methods of fastener inspection have been known to be very time consuming and lacking in adequate precision. The present invention overcomes these drawbacks by providing an automatic inspection device that utilizes machine vision and robotics to accomplish precise inspection automatically. How the invention accomplishes this is set forth below.

DISCLOSURE OF THE INVENTION

A device constructed in accordance with this invention includes a fastener feed track having a feed gate connected to one end. The track defines a feed passageway, and exiting movement from the track is automatically controlled by the feed gate. A chuck axially reciprocates back and forth and carries fasteners from the feed gate to a fastener imaging position. During operation of the device, the chuck is first moved adjacent the feed gate sufficiently close so that a fastener exiting the track contacts the chuck's forward end. This end has a centered, axial orifice suitably connected to a vacuum line which creates a suction effect that holds the fastener to the chuck. The chuck is then moved to the imaging position where the fastener's picture is taken by video cameras.

The feed gate has a pair of laterally moving gate members which are operable to move apart or together for, respectively, opening or closing the gate. This, in turn, permits or blocks fastener exiting movement from the track. The gate members each have inner lateral side edges that are curved in a manner so that when the gate members come together the lateral edges cooperatively define a small opening. It is smaller than the diameter of a typical fastener's head, which therefore prevents a fastener from passing through, but it is also sufficiently large to permit a typical fastener's body to pass.

The gate members are closed when the chuck is moved adjacent the feed gate. In this position, the end of the chuck is close enough to the gate so that when it is opened only the exiting fastener's head portion travels past the gate members before such portion contacts the chuck. Most of the fastener's body remains in between the gate members. The gate members then close, with their curved lateral edges centering the body, and thus the head, relative to the vacuum orifice in the chuck's end.

As mentioned above, since the opening created by the closed gate member's lateral edges is larger than the fastener's body, the vacuum-attached fastener slides out through this opening as the chuck moves to the imaging position. When this happens, any fastener which is upstream of the attached fastener is blocked from exiting by the closed gate members.

In the imaging position, a pair of video cameras each produce a fastener image that can be used to obtain its actual dimensions. These are digitized and compared with prestored computerized dimensional data. Afterward, the fastener is removed from the chuck by deactivating the vacuum line.

An advantage to the present invention is that it provides a device that is simple, cost-effective and is readily adaptable to computer control. This eliminates both the imprecise and time consuming procedures associated with manual inspection. These advantages, and others, will become apparent when considering the following description.

BRIEF DESCRIPTION OF THE DRAWINGS

In the drawings, like reference numerals refer to like parts throughout the various views, and wherein:

FIG. 2 is a side view of a closed feed gate positioned transversely across the exit end of a fastener feed track;

FIG. 3 is a view like FIG. 2, but shows laterally sliding gate members of the feed gate moved apart, to open the gate;

FIG. 4 is a top plan view of a vacuum chuck constructed in accordance with the invention, which removes a fastener from the feed gate shown in FIGS. 2 and 3;

FIG. 5 is a side cross-sectional view of the vacuum chuck shown in FIG. 4 but is rotated ninety degrees from that view;

FIG. 6 is a top plan view schematically showing the vacuum chuck of FIGS. 4 and 5 positioned next to the feed gate of FIGS. 2 and 3, at which position the chuck receives a fastener from the feed gate;

FIG. 7 is a view like FIG. 6, but shows the vacuum chuck moved away from the feed gate so that a video image of the fastener may be produced;

BEST MODE FOR CARRYING OUT THE INVENTION

Figure 1:
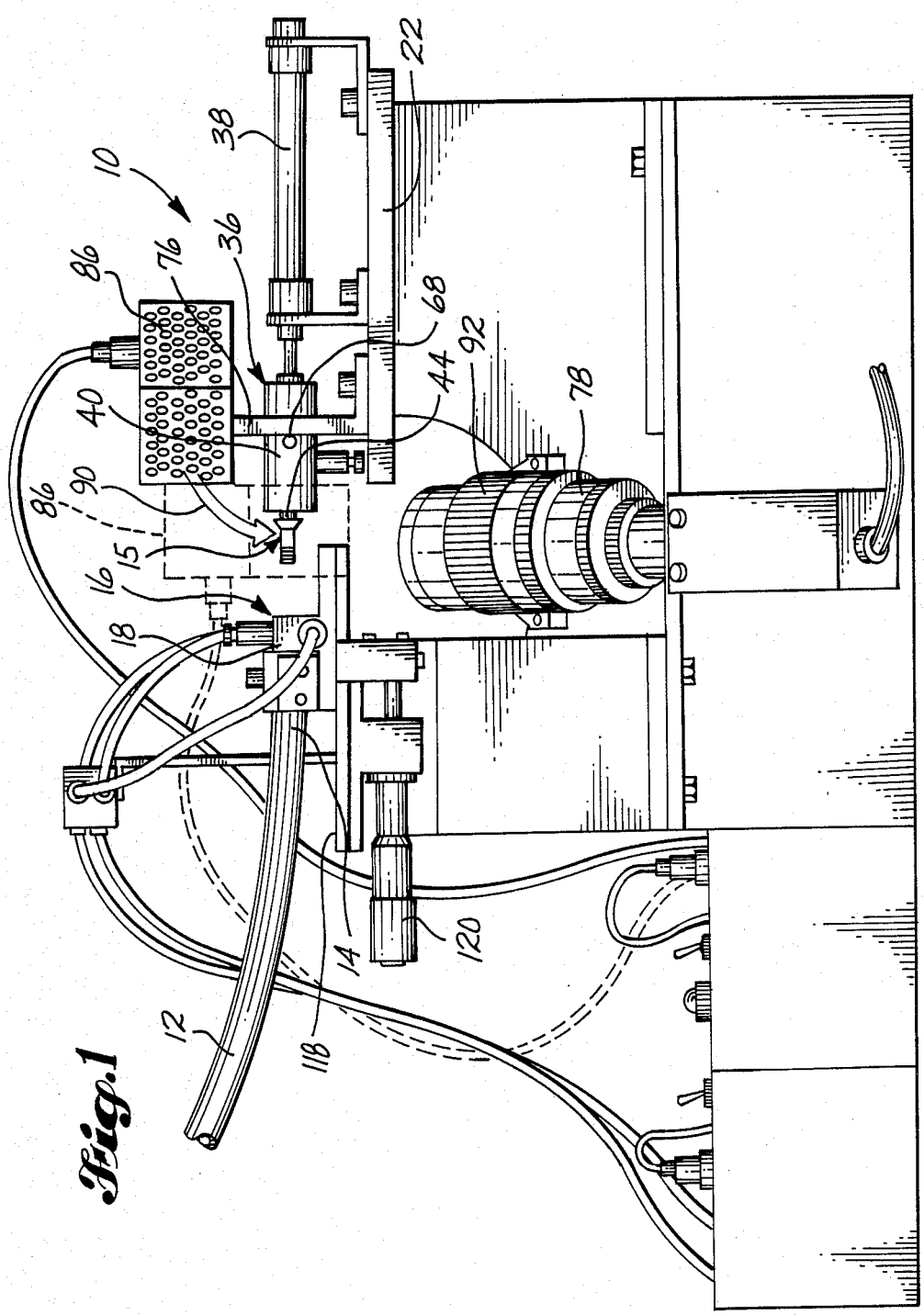
FIG. 1 is a side view of a fastener inspection device constructed in accordance with the invention.

In the drawings, and referring first to FIG. 1, therein is shown at 10 a fastener inspection device constructed in accordance with a preferred embodiment of the invention. The device 10 includes a feed track 12, which is preferably in the form of a hollow tube. The tube's lower end 14 is connected to a feed gate portion 16 of the device. A plurality of fasteners 15 are sequentially positioned head-first in the tube 12 (see FIG. 6) and are moved or driven toward the feed gate by air pressure, the force of gravity, or any other suitable means.

Directing attention to FIGS. 2 and 3, the upper part 18 of feed gate 16 is in the form of a generally rectangular block having an opening 20 that extends through its thickness. This opening 20 is in direct communication with tube 12 and therefore defines the tube's exit end. A pair of laterally sliding gate members 22, 24 are positioned in this part 18 and can be moved toward and away from each other, as is respectively shown in FIGS. 2 and 3. Moving them together closes the feed gate 16, and likewise, moving them apart opens it. This is controlled by conventional pneumatic lines 26, 28 which would be familiar to a person skilled in the art.

When the gate is opened, as is shown in FIG. 3, a fastener in the tube 12 is permitted to pass through gate part 18. When the gate members 22, 24 are thereafter moved together, to close opening 20, their inner lateral edges 30, 32 come together and define a small circular opening having a diameter slightly larger than the diameter of the fastener's body 34, but smaller than its head 33. Each gate member edge 30, 32 preferably has a generally semi-circular shape or curvature so that each edge has approximately the same curvature as the fastener's body 34. When the gate members 30, 32 come together their inner edges 30, 32 surround the fastener's body 34 and also center it prior to its removal from gate part 18. The gate members 22, 24 also have sliding ramp edges 35, 37 which guide the fastener's body up to semi-circular edges 30, 32 as the gate members close.

Referring once again to FIG. 1, the device 10 also includes a vacuum chuck 36 that is axially movable back and forth by a suitable pneumatic cylinder 38 for removing the fastener 15 from the feed gate 16. The preferred construction of the chuck 36 is best illustrated in FIGS. 4 and 5. It has a hollow outer casing 40 which surrounds a slidable inner part 42. The latter is generally cylindrical in shape and has a cylindrical axial end portion 44 that is extendible outwardly through a forward end opening 46 in the chuck's outer casing 40. This portion's end 48 is normally held flush with the casing's forward surface 50 as the chuck 36 moves by an internal spring 52 biased to push sliding part 42 toward the right. A conventional threaded end plug 52 encloses the chuck's casing 40 and holds part 42 inside.

Referring to FIG. 6, when the chuck 36 is axially moved adjacent feed gate 16, its forward surface 50 is positioned just outside feed gate members 22, 24 so that when they are opened, th fastener's head 33 but not its entire body 34 passes by the gate members 22, 24. Then, as the feed gate 16 closes, wherein gate members 22, 24 come together, the fastener is centered by the gate members 22, 24 so that its head 33 is directly over an opening or orifice 56 in the axial end portion 48 of the chuck's sliding part 42. This orifice 56 is in airflow communication with a vacuum line 58 that extends into chuck part 42 by means of a conventional air fitting 60. The fitting 60 is connected to part 42 by extending through a slot 62 in the chuck's outer casing 40, and is threaded into part 42.

The fitting 60 permits air to be sucked through orifice 56 which creates sufficient suction between the fastener's head 33 and the chuck's forward end 48 to hold the fastener against it as the chuck 36 moves away from the feed gate 16. When this happens, the fastener's body 34 slides outwardly from gate members 22, 24. However, the next fastener 64 upstream (see FIG. 4) is blocked by the closed gate members 22, 24.

The chuck 36 further includes lateral bars 66, 68 which extend through slots 70, 72 on each side of its outer casing 40. These are fixedly connected directly to the chuck's sliding part 42. As the chuck 36 moves into the fastener imaging or viewing position the side bars 66, 68 abut against a pair of vertical supports 74, 76, which cause the chuck's sliding part 42 to move against the bias of spring 52. This in turn causes axial end portion 44 of the sliding part to project outwardly in the manner shown in FIGS. 4 and 7. The advantage of this is that it moves the fastener away from the chuck's casing 40 for providing a good camera view.

Figure 8:
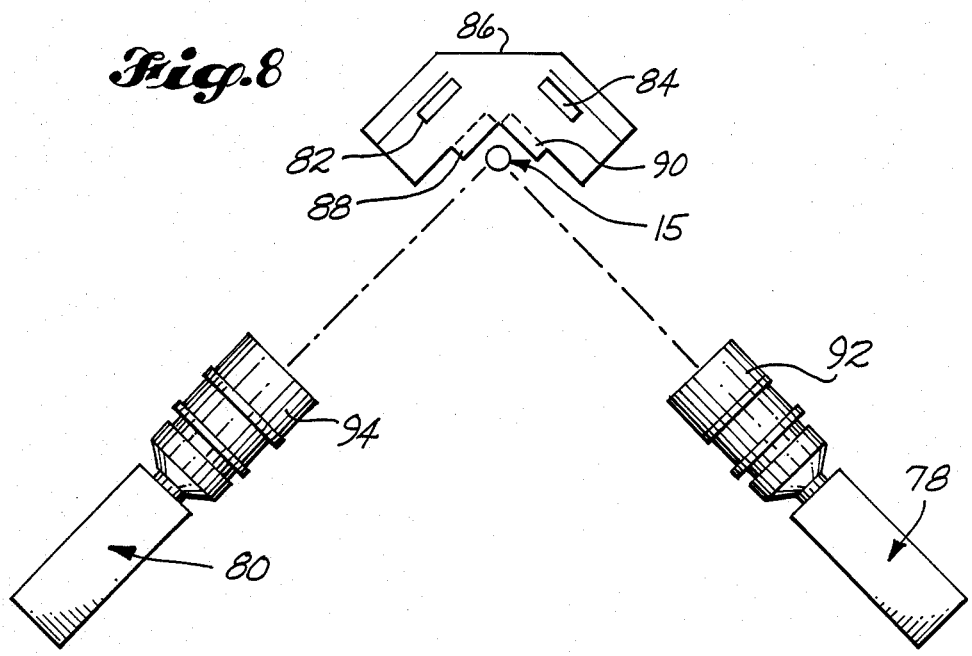
FIG. 8 is a schematic view showing how the invention uses a pair of video cameras oriented ninety degrees from each other to produce an image of the fastener.

Referring to FIG. 8, the device 10 utilizes two video cameras 78, 80 to produce a fastener image. These cameras 78, 80 are positioned 90° from each other and this configuration makes it possible to determine the depth of the fastener's position relative to one camera, and vice versa. The advantage to this is that it enables calculation of the fasteners position by known mathematical methods and eliminates complex guiding mechanism normally required to physically position the fastener 15 precisely.

Fastener back lighting for the cameras 78, 80 is provided by two conventional LED light sources 82, 84, each being received in a ventilated housing 86 mounted to supports 74, 76. These light sources transmit light through diffusers 88, 90 which are normally behind the fastener 15, at least with respect to the cameras 78, 80. Although the LED housing 86 is usually in the position shown in FIG. 8, at certain times it may be rotated upwardly away from the fastener when the device 10 is in full operation. This is shown in FIG. 1. Arrow 90 in FIG. 1 indicates the shield's rotation into the normal operating position.

Figure 9:
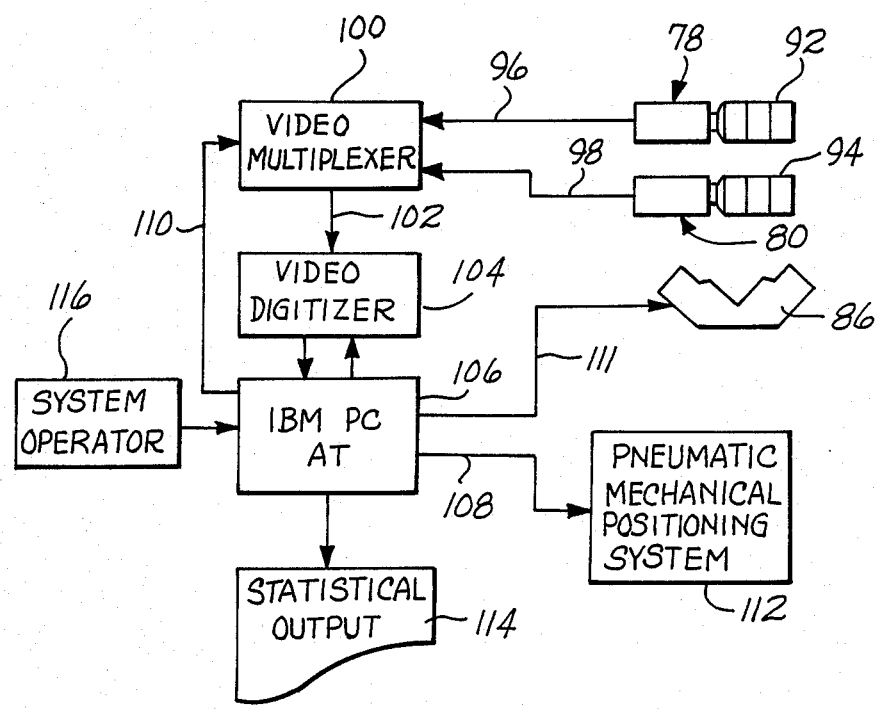
FIG. 9 is a schematic view illustrating how the invention may be incorporated as an automatic robotic system.

Referring to FIG. 9, the invention's video imaging system consists of the two previously-mentioned cameras 78, 80 which are preferably two solid state CCD video cameras fitted with 55 millimeter macro-NIKKOR (trademark) lenses 92, 94. Lenses of this type give approximately a ½-inch field of view at a 5-inch distance. The two LEDs 82, 84 are switchable and provide backlighting in correspondence with use of one camera 78, 80 at a time. A video image of the fastener's silhouette is produced from signals 96, 98 provided by each camera 78, 80 which are fed into a video multiplexer 100 where they are switched back and forth in synch with LED switching. The multiplexer's output 102 is fed to a suitable video digitizer card 102 in a computer 106 such as, by way of example, the IBM PC (trademark). The digitizer 104, which would be familiar to a person skilled in the art, converts the video signal into dimensional data that can be accessed directly by the computer 106.

In preferred form, the computer 106 is programmed to control system components automatically. In this regard, the computer 106 may provide appropriate signals 108, 110, 111 to automatically control system pneumatics 112 and the video imaging components 78, 80, 86. Video images produced by the camera 78, 80 are digitized and processed with "C" written algorithms to extract measurements of head and shank diameter, head angle, head protrusion, fillet radius, eccentricity and perpendicularity. These measurements are then tabulated and compared with prestored desired dimensions or specifications and are output into any suitable statistical form 114 that might be desired. A precision ground gauge pin of known dimensions is used to calibrate the entire system 10 at the beginning of an inspection run of a series of like fasteners.

During automatic or robotic operation of the device 10, the computer 106 is suitably programmed to operate the device in the following sequence: First, the vacuum chuck 36 is moved forward as shown in FIG. 6. Then, the feed gate portion 16 is opened which permits exiting movement of one fastener and advancement of all fasteners through the tube 12 (after the gauge pin is used to calibrate the system). The feed gate 16 then closes, centering the fastener as shown in FIG. 2. At that point, vacuum in the chuck 36 is made operable which attaches the fastener 15 to the chuck. The computer 106 then moves the chuck 36 back to the imaging or measuring position and activates the cameras 78, 80. After an image is produced and fastener measurements are derived therefrom, the vacuum in the chuck is turned off and the fastener is removed from the system. At that point, the computer repeats the above sequence of events.

It is to be understood that the device 10 may operate under two modes of control, i.e. manual or automatic. Manual operation permits a system operator 116 to take over direct control of chuck positioning and the video and light source switching. Automatic control would give complete control to the computer 106.

Once again referring to FIG. 1, by way of nonlimiting example the feed gate 16 may be situated on top of a flat supporting surface 118 and its position relative to the chuck 36 could be made adjustable by means of a suitable screw drive 120. The chuck and its associated pneumatic drive 38 may be mounted on top of a similar support 122.

Having thus described the presently known best mode for carrying out the invention, it is to be understood that the invention as described above could be modified in many ways without departing from its spirit and scope. Any patent protection due is therefore to be limited not by the above description but by the subjoined claims, wherein interpretation of such claims is to be made in accordance with established rules of claim interpretation.

What is claimed is:

1. An apparatus for use in inspecting fasteners, comprising:
    a fastener feed track having an exit end;
    feed gate means operable to control fastener exiting movement from said track's end;
    a chuck member reciprocatively movable back and forth along an axis between two positions, said chuck member having an end portion that normally faces said exit end, said end portion being positioned adjacent said exit end when said chuck member is in one of said reciprocative positions, in a manner so that an exiting fastener contacts said end portion;
    means, connected to said chuck member, for using a vacuum to attach said exiting fastener to said chuck member's end portion, and to hold said fastener in such attachment when said chuck member moves to said other reciprocative position; and
    video imaging means operable to produce a video image of said attached fastener when said chuck member is in said other reciprocative position.

2. The apparatus of claim 1, wherein said feed gate means includes means for centering said fastener relative to said reciprocative axis.

3. The apparatus of claim 2, wherein said fastener has a cylindrical body portion and a radially projecting head portion at one end thereof, said head portion having a diameter that is larger than the diameter of said body portion, and wherein said feed gate means includes a gate body disposed transversely across said exit end of said fastener feed track, said body having an opening extending therethrough in a manner so as to permit said exiting fastener to leave said track and pass through said body, and wherein
    said centering means comprises first and second laterally movable gate members received in said body, said gate members being movable together and apart across said body opening, each gate member having a lateral side portion that is curved, and wherein when said gate members are moved together said curved portions cooperatively guide said fastener body portion to a position such that said body portion is substantially centered relative to said axis.

4. The apparatus of claim 1, wherein said fastener has a cylindrical body portion with a radially projecting head portion at one end thereof, said head portion having a diameter that is larger than the diameter of said body portion, and wherein said feed gate means further includes
    a gate body disposed transversely across said exit end of said fastener feed track, said gate body having an opening extending therethrough in a manner so as to permit said exiting fastener to leave said track and pass through said body, and further having first and second laterally movable gate members received in said gate body, said gate members being movable together and apart across said body opening to respectively block and permit fastener exiting movement through said body opening, wherein when said gate members are apart said chuck member is normally in said reciprocative position adjacent said exit end, and is sufficiently close to said body opening so that said exiting fastener' head portion contacts said chuck member's end portion, and in such position, said exiting fastener's body portion is positioned between said gate members, said gate members each having a lateral side portion curved to the shape of said fastener body portion, in a manner so that when said gate members are moved together said curved portions define a circular opening in which said fastener body portion is slidably received, said circular opening having a diameter that is smaller than the diameter of said head portion.

5. The apparatus of claim 1, wherein said chuck member includes an outer casing having an axial end opening, and an inner member slidably received in said casing, said slidable member having an axial end portion that slidably extends outwardly through said casing end opening when said slidable member slides toward said chuck member's forward end, said vacuum means including a vacuum orifice in said axial end portion, and a spring operably positioned between said casing and said inner member and biased to normally push said inner member away from said casing end opening.

* * * * *

UNITED STATES PATENT AND TRADEMARK OFFICE
CERTIFICATE OF CORRECTION

PATENT NO. : 4,828,159

DATED : May 9, 1989

INVENTOR(S) : Mark A. Woods

It is certified that error appears in the above-identified patent and that said Letters Patent is hereby corrected as shown below:

Column 1, line 59 "smaler" should be -- smaller --.

Column 3, line 49, "th" should be -- the --.

Column 4, line 19, "fasteners" should be -- fastener's --.

Claim 4, column 6, line 43, "fastener' " should be -- fastener's --.

Signed and Sealed this

Sixth Day of March, 1990

*Attest:*

JEFFREY M. SAMUELS

*Attesting Officer*     *Acting Commissioner of Patents and Trademarks*